United States Patent [19]

Chang et al.

[11] Patent Number: 4,670,267
[45] Date of Patent: Jun. 2, 1987

[54] FERMENTED-WHEY BUTTER FLAVORING

[75] Inventors: Stephen S. Chang; Chi-Tang Ho, both of East Brunswick; Barbara A. Izzo, Bridgwater, all of N.J.

[73] Assignee: Lever Brothers Company, New York, N.Y.

[21] Appl. No.: 724,846

[22] Filed: Apr. 18, 1985

[51] Int. Cl.$^4$ .................... A23C 21/02; A23L 1/22
[52] U.S. Cl. .................................. 426/41; 426/35; 426/603; 426/613; 426/650
[58] Field of Search ............ 426/41, 35, 613, 650, 426/603, 583

[56] References Cited

U.S. PATENT DOCUMENTS

| | | | |
|---|---|---|---|
| 2,144,906 | 1/1939 | Waterman et al. | 426/613 |
| 2,233,179 | 2/1941 | Otting et al. | 426/35 X |
| 2,971,847 | 2/1961 | Babel et al. | |
| 3,048,490 | 8/1962 | Lundstedt | 426/41 X |
| 3,469,993 | 9/1969 | Pangier | 426/35 |
| 3,477,857 | 11/1969 | Colburn | 426/35 |
| 4,020,185 | 4/1977 | Andersen et al. | |
| 4,304,862 | 12/1981 | Troller | |
| 4,384,008 | 5/1983 | Mellisor | 426/613 |
| 4,414,229 | 11/1983 | Bakal et al. | 426/603 X |
| 4,454,160 | 6/1984 | Jönsson et al. | 426/41 X |

FOREIGN PATENT DOCUMENTS

| | | |
|---|---|---|
| 0073629 | 3/1983 | European Pat. Off. . |
| 0137536 | 4/1985 | European Pat. Off. . |
| 1133533 | 11/1968 | United Kingdom . |
| 302094 | 7/1971 | U.S.S.R. .................... 426/603 |

OTHER PUBLICATIONS

Webb et al, Byproducts from Milk, 2nd Ed., 1970, Avi: Westport, Conn., pp. 43–45, 77.
Lundstedt, *J. Dairy Sci.*, 45, 1320–1326 (1962).
FSTA vol. 6 (1974) 12 P 1867.
Journal American Oil Chemists Soc., Oct. 1975 (vol. 52) D. 568A.
Pack et al., 51 J. Dairy Science 339–344 (1967).
Collins, 55 J. Dairy Science 1022–1028.
Cogan, 42 J. Dairy Res. 139–146 (1975).
Ausavanodom, et al., 60 J. Dairy Science 1245–1251 (1977).
Gilliland, 55 J. Dairy Science 1028–1031.
Richardson, et al., 60 J. Dairy Science 378–386.
Collins, 60 J. Dairy Science 799–804.
Drinan et al., 31 App. and Environ. Microbiology 481–486.
Melowhey 100, Product Bulletin No. 7917, Dairyland Products, Inc.

*Primary Examiner*—Joseph Golian
*Attorney, Agent, or Firm*—Milton L. Honig; James J. Farrell

[57] ABSTRACT

A butter flavoring composition is prepared by fermenting a sweet-whey medium. The sweet-whey medium comprises water, sweet-whey solids, a biosynthesis-precursor-compound fortifier, and a fatty-compound enriching agent. The sweet-whey medium is pasteurized and then innoculated with a microorganism culture comprising the microorganism *Leuconostoc cremoris*. The innoculated medium is then incubated in a controlled temperature range with agitation and aeration to produce a fermented composition suitable for use as a butter flavoring.

2 Claims, No Drawings

FERMENTED-WHEY BUTTER FLAVORING

TECHNICAL FIELD

The present invention relates to a butter flavoring prepared by fermenting a sweet-whey medium.

BACKGROUND ART

Margarines have gained wide consumer acceptance as a substitute for butter. Consumers frequently prefer margarine over butter because margarine is usually less expensive than butter and generally has a lower proportion of saturated fats than butter. However, in spite of a vast amount of research in developing butter flavorings for margarines, consumers generally prefer the taste of butter to the taste of margarines previously available. Even premium grades of margarine have been described as "chemical" or "synthetic" in flavor. Indeed, recently blends of margarine and butter have been introduced commercially in order to provide a product which has at least some of the advantages of margarine but which has a more satisfactory butter taste.

One of the many components of natural butter flavor is the compound diacetyl, which is a ketone having a characteristic "buttery" aroma. It has been known that diacetyl in dairy products is generally produced by the fermentation of milk citrates by bacteria of the Leuconostoc species and the *Streptococcus diacetilactis* strain. M. Y. Pack et al. *J. Dairy Science*, vol. 51, pp. 339-344 (1967). It has been observed that fortifying milk with additional citrate can enhance the production of diacetyl by certain dairy cultures growing in the milk. E. B. Collins, *J. Dairy Science*, vol. 55, pp. 1022-1028. The addition of citric acid to a culture of *Leuconostoc cremoris* growing in a medium of skim milk fortified with yeast extract gave rise to the production of diacetyl and a related compound, acetoin, whereas no diacetyl or acetoin was produced by the culture when no citric acid was added. T. M. Cogan, *J. Dairy Res.*, vol. 42, pp. 139-146(1975).

Cultured dairy products such as cottage cheese are often produced using "starter cultures" of microorganisms. The microorganism which is to convert milk or a milk derivative into the desired cultured dairy product is first grown in a suitable medium to form a starter culture. When the population of the microorganism in the starter culture is sufficiently high, the starter culture is added to the milk or milk derivative. Liquid cheddar-cheese whey combined with certain inorganic phosphates and other compounds has been used as a medium for starter cultures. N. Ausavanodom et al., *J. Diary Science*, vol. 60, p. 1245-1251 (1977).

Certain types of starter cultures can be distilled to produce a starter-culture distillate which is used as a flavor additive in margarine and other foods. Pack et al. supra, page 344. However, as noted above, the flavors of even premium grades of margarine heretofore available leave much room for improvement.

DISCLOSURE OF THE INVENTION

We have invented a flavoring composition which closely resembles the flavor of natural butter and which avoids problems of the prior art noted above.

Broadly, the butter flavoring of the invention is produced by a fermentation process. The process includes a step of preparing a sweet-whey medium. The sweet-whey medium comprises sweet-whey solids dispersed in water, a biosynthesis-precursor-compound fortifier and a fatty-compound enriching agent. The fortifier can be citric acid, a derivative of citric acid, pyruvic acid, a derivative of pyruvic acid, or mixtures thereof. Suitable derivatives of citric acid for the fortifier include sodium citrate, calcium citrate and other edible salts of citric acid; suitable derivatives of pyruvic acid include sodium pyruvate, calcium pyruvate and other edible salts of pyruvic acid. The enriching agent can be milk or other fatty compound, a derivative of such a fatty compound, or mixtures thereof.

The process of the invention includes the step of pasteurizing the sweet-whey medium. The pasteurized sweet-whey medium is inoculated with a microorganism culture which includes the microorganism *Leuconostoc cremoris*. The inoculated sweet-whey medium is agitated for an incubation period in a container open to air or otherwise exposed to an oxygen-containing atmosphere to aerate the medium during fermentation. The temperature of the inoculated sweet-whey medium during the incubation period is maintained within a temperature range which is effective to promote the growth of the microorganism culture. The sweet-whey medium thus fermented yields an aqueous composition suitable as a butter flavoring. The fermented sweet-whey medium can be added directly to a margarine base to produce a margarine having an excellent butter flavor.

The enriching agent used in the process of the invention is preferably milkfat or a derivative of milkfat. Preferably, milkfat is added to the sweet-whey medium to a concentration of about 2 percent or less by weight relative to the weight of the medium. Heavy cream is a preferred source of the milkfat. Alternatively, lipolyzed butterfat may be employed as an enriching agent, most preferably in a concentration of about 0.2 percent by weight relative to the weight of the sweet-whey medium.

Most preferably, the butter flavoring composition of the invention includes two fermented sweet-whey media mixed together after fermentation. A first sweet-whey medium of the combination employs milkfat from heavy cream as the enriching agent. A second sweet-whey medium employs lipolyzed butterfat as the enriching agent. Surprisingly, the taste of a margarine incorporating such a mixture of two separately-fermented sweet-whey media is noticeably superior to the taste of a margarine incorporating a sweet-whey medium which included a mixture of milkfat from heavy cream and lipolyzed butterfat at the outset prior to fermentation.

The fermented-whey compositions of the invention can be used to flavor margarines, cooking oils, cheeses, and other edible-fat food products.

Preferred butter flavoring compositions of the invention are economical to produce. A major component of the composition is sweet whey, which is a by-product of cheese making which at the present time is produced in quantities which exceed demand. In addition, the fermented-whey compositions of the invention can be incorporated directly into a margarine base without the expense of further processing.

The flavoring compositions of the invention need not incorporate any chemically synthesized ingredient. Flavoring compositions of the invention are thus preferably naturally produced, which has a significant commercial appeal.

A preferred butter flavoring of the invention was incorporated in a margarine base to form a soft tub margarine. The resulting margarine was compared to a commercially-available premium-grade soft tub margarine by a panel of 60 persons trained in evaluating butter-flavored products. The panel evaluated both margarines for 41 flavor notes associated with butter. Although the fermented-whey margarine of the invention scored lower in diacetyl character and was relatively weak in overall flavor intensity compared to the commercial margarine, the margarine of the invention scored higher in the buttery, creamy, blended, and balanced flavor characteristics. In addition, a 30-member panel compared the fermented-whey margarine of the invention to the commercial margarine. Twenty-three members of the panel preferred the margarine of the invention to the commercial control. Twenty-one members of the panel considered the fermented-whey margarine of the invention to be more "butter-like" than the commercial margarine.

BASIC PARAMETERS OF THE INVENTION

The sweet-whey medium used in the fermentation process of the invention preferably contains from about 8 percent by weight to about 20 percent by weight sweet-whey solids based on the weight of the medium. Sweet whey is available in a number of forms, including liquid dispersions and spray-dried powders. For the present invention, spray-dried powders are generally preferred. A preferred spray-dried sweet-whey powder obtained by drying concentrated cheese whey has the following typical analysis:

TABLE I

| Protein | 12.7% |
|---|---|
| Lactose | 72.2% |
| Fat | 1.1% |
| Minerals | 8.1% |
| Moisture | 4.5% |
| pH | 5.9 |
| Scorched Particles | 7.5 mg/25 gm. |

Such a preferred sweet-whey powder is commercially available from Dairyland Food Laboratories, Inc. of Waukesha, Wis. under the trade name of "Dairyland Melowhey 100." The spray-dried sweet-whey solids are preferably dispersed in distilled water to form the medium.

The biosynthesis-precursor-compound fortifier for the medium is preferably citric acid or pyruvic acid. The concentration of the acid in the medium is preferably in the range of from about 0.1 to about 0.4 percent by weight relative to the weight of the medium. Most preferably, the concentration of citric acid is about 0.35 percent by weight relative to the weight of the medium and the concentration of pyruvic acid is about 0.3 percent by weight relative to the weight of the medium.

Milkfat is one preferred enriching agent for the medium. Preferably, the concentration of milkfat is at least about 0.5 percent by weight relative to the weight of the medium. Generally, the greater the concentration of milkfat, the better the flavor of the resulting flavoring composition, up to a concentration of about 2 percent by weight milkfat relative to the weight of the medium. A greater concentration of milkfat produced substantially no improvement of the flavor of the resulting fermented medium. For reasons of economy, the most preferred concentration of milkfat is about 2 percent by weight relative to the weight of the medium. A preferred source of milkfat is commercially-available heavy cream.

A second preferred enriching agent is a lipolyzed butterfat. Lipolyzed butterfat is obtained by treating butterfat with an enzyme to break down the fat partially to fatty acids. A suitable lipolyzed butterfat is commercially available as an emulsion from Marschall Laboratories of Madison, Wis. under the trade name "Marstar Flavor L95." The concentration of the lipolyzed butterfat emulsion is preferably in the range of about 0.1 percent to about 2 percent by weight relative to the weight of the medium, with the higher concentrations of this range tending to give a "cheesy" note to the fermented medium. Most preferably, the concentration of the lipolyzed butterfat emulsion is about 0.2 percent by weight relative to the weight of the medium.

The sweet-whey medium is preferably pasteurized by heating the medium to about 80° C. for about one minute while agitating the medium vigorously with a blade stirring apparatus.

The innoculant for initiating the fermentation of the sweet-whey medium includes the microorganism *Leuconostoc cremoris*. The microorganism *Leuconostoc cremoris* has also been referred to by the name *Leuconostoc citrovorum*. *Leuconostoc cremoris* is a gram-positive, non-spore-forming, microaerophilic, catalase-negative bacteria. Preferably, an essentially pure culture of *Leuconostoc cremoris* is used to innoculate the sweet-whey medium. A suitable culture of this microorganism in lyophilyzed form having an activity of about $1 \times 10^9$ viable cells per gram is commercially available from Chr. Hansen's Laboratory of Milwaukee, Wis. under the trade designation "Citric Acid Fermenting" (CAF) culture.

The innoculated sweet-whey medium is fermented by maintaining it in a temperature range of preferably from about 20° C. to about 28° C. and more preferably from about 20° C. to about 25° C. A temperature of about 22° C. is most preferred. During fermentation the medium is preferably agitated while exposed to air so as to aerate the medium. The agitation also serves to keep the solids in the medium in suspension. The medium is preferably incubated for a time period in a range of about 8 hours to about 32 hours. Most preferably the incubation time is about 24 hours.

Preferably, after the incubation time the fermented medium is refrigerated to a temperature of about 6° C. for several hours to develop flavor. After about 24 hours under refrigeration the flavor of the fermented medium begins to decline. Consequently, it is preferred to use the fermented medium within about 24 hours after fermentation.

As noted above, the most appealing butter flavor is obtained when two separately fermented sweet-whey media are combined: one medium containing milkfat from heavy cream as an enriching agent and the other containing lipolyzed butterfat as an enriching agent. Most preferably, when the first medium includes about 2 percent by weight milkfat from heavy cream and the second medium contains about 0.2 percent by weight lipolyzed butterfat, the first and second fermented media are combined in relative proportions of about 70:30 by volume.

The fermented sweet-whey medium of the invention can be combined with a margarine base without further processing. A suitable margarine base includes a partially hydrogenated vegetable oil, soybean oil, mono- and diglycerides, soybean-oil lecithin, beta-carotene, water, salt, powdered whey solids, sodium benzoate and lactic acid. Preferably, the concentration of the flavoring composition of the invention in the margarine is in the range of from about 5 to about 15 percent by weight relative to the total weight of the margarine. Most preferably, the fermented whey composition constitutes about 7 percent by weight of the margarine.

BEST MODE FOR CARRYING OUT THE INVENTION

Example I

A preferred margarine employing the fermented-whey butter flavoring of the present invention was prepared as follows.

Approximately 200 ml of a first sweet-whey medium was prepared by mixing distilled water, "Dairyland Melowhey 100" spray-dried sweet-whey solids, anhydrous citric acid, and heavy cream. The relative proportions of the ingredients are given in the following Table II:

TABLE II

| Ingredient | Parts By Weight |
| --- | --- |
| Distilled Water | 83.55 |
| Sweet-Whey Solids | 10.00 |
| Citric Acid | 0.35 |
| Heavy Cream | 6.10. |

The heavy cream contained approximately 33 percent by weight milkfat.

The first sweet-whey medium was flash pasteurized by agitating with a blade mixer and then heating to about 80° C. for about one minute. The sweet-whey medium was then allowed to cool to room temperature.

Forty-ml aliquots of the first sweet-whey medium were placed in 250-ml Erlenmeyer flasks. The flasks were stoppered with non-absorbent cotton plugs available from Ace Scientific of East Brunswick, N.J. The flasks were placed in a refrigerator at about 6° C. until the contents cooled to approximately 25° C. When the media in the flasks reached approximately 25° C., the flasks were removed from the refrigerator and divided into two groups. Each flask in the first group was innoculated with 100 mg of CAF culture.

The flasks of the second group served as controls and were not innoculated. The flasks containing innoculated and non-innoculated media were mounted in a controlled-environment incubator-shaker commercially available from New Brunswick Scientific of Edison. N.J. under the trade name "Gyrotory Model G25-R." The temperature in the incubator-shaker was controlled by a refrigerative circulation unit commercially available from Precision Scientific Group of Chicago, Ill. under the trade name "Circulation System #254." The temperature was maintained at approximately 22° C. during the incubation. The incubator-shaker was set to a setting of about 250 RPM during the incubation to agitate the media in the flasks. The cotton plugs in the flasks permitted air to reach the contents of the flasks during incubation. The flasks were incubated for approximately 24 hours.

After the incubation period the flasks were removed from the incubator-shaker and stored at approximately 6° C. to suspend any further fermentation activity and to permit flavor volatiles produced by the action of the microorganism cultures to accumulate.

Approximately 200 ml of a second sweet-whey medium was prepared from the same ingredients as the first sweet-whey medium with the exception that "Marstar Flavor L95" lipolyzed butterfat emulsion was substituted for the heavy cream. The proportions of the ingredients in the second sweet-whey medium are given in Table III below:

TABLE III

| Ingredient | Parts By Weight |
| --- | --- |
| Distilled Water | 89.45 |
| Sweet-Whey Solids | 10.00 |
| Citric Acid | 0.35 |
| Lipolyzed Butterfat Emulsion | 0.20. |

The second sweet-whey medium was fermented according to the same procedure as given above for the first sweet-whey medium.

After about two hours under refrigeration at about 6° C., the flasks of the various media were removed from the refrigerator and allowed to warm to room temperature. The first sweet-whey medium which had been innoculated with the CAF culture exhibited a characteristic buttery aroma. The s sweet-whey medium which had been innoculated with the 5 exhibited a cheesy aroma with butter notes. None of the control samples which had not been innoculated exhibited such a buttery or cheesy aroma.

A soft tub margarine was prepared as follows. A fermented-whey butter flavoring composition was prepared by combining about 70 parts by volume of the fermented first sweet-whey medium described above and about 30 parts by volume of the fermented second sweet-whey medium. The resulting composite fermented-whey butter flavoring composition was combined with a margarine base. The margarine base had an oil phase and an aqueous phase. The oil phase of the margarine base had the composition given in Table IV below:

TABLE IV

| Margarine-Base Oil Phase: | Parts By Weight |
| --- | --- |
| Partially Hydrogenated Vegetable Oil | 79.9 |
| Soybean Oil Mono- and Di-glycerides | 0.25 |
| Soybean Oil Lecithin | 0.22 |
| Beta-Carotene | 0.0053 |
| Total: | 80.2 |

The aqueous phase for the margarine base was prepared by mixing the ingredients listed in Table V below.

TABLE V

| Margarine-Base Aqueous Phase: | Parts by Weight |
| --- | --- |
| Distilled Water | 10.76 |
| Salt | 1.15 |
| Powdered Whey Solids | 0.8 |
| Sodium Benzoate | 0.10 |
| Lactic Acid | 0.017 |
| Total: | 12.8 |

The aqueous phase was flash pasteurized by agitating with a blade-stirring apparatus and heating to about 80° C. for about one minute. The margarine-base oil phase was similarly agitated and mildly heated to liquify the partially-hydrogenated vegetable oil.

The pasteurized margarine-base aqueous phase, the liquified margarine-base oil phase and the composite fermented-whey butter flavoring were combined to obtain a crude margarine emulsion of about 80.2 percent by weight margarine-base oil phase, about 12.8 percent by weight margarine-base aqueous phase, and about 7 percent by weight fermented-whey butter flavoring. The crude emulsion was homogenized in a homogenizer commercially available by Brinkman Instruments of Westbury, N.Y. under the trade name "Polytron Kinematica Homogenizer" to form an emulsion which would not separate upon standing. The resulting margarine emulsion was processed in a one-half gallon capacity electric ice cream maker at a temperature of about 0° C. The ice cream maker is commercially available from Dynamics Corporation of America of New Hartford, Conn. under the trade name "Waring Brand Ice Cream Parlor #CF520-1." The resulting margarine was divided among eight-ounce plastic tubs and was found to have a excellent butter flavor and texture.

Example II

Six sweet-whey media were prepared which were identical to the first sweet-whey medium of Example I with the exception that the proportion of milkfat was respectively about 0.5, 1.0, 1.5, 2.0, 2.5 and 3.0 percent by weight relative to the weight of the medium. The six sweet-whey media were pasteurized and fermented as described in Example I. Each of the resulting six fermented media had an acceptable butter flavor. The medium starting with about 2.0 percent by weight milkfat yielded the most satisfactory butter flavor.

Example III

Seven sweet-whey media were prepared which were identical to the second sweet-whey medium of Example I with the exception that the proportion of lipolyzed butterfat was respectively about 0.1, 0.2, 0.3, 0.5, 1.0, 1.5, and 2.0 percent by weight relative to the weight of the medium. The seven sweet-whey media were pasteurized and fermented as described in Example I. Each of the resulting seven fermented media was an acceptable buttery-cheesy flavoring composition, although the fermented medium starting with about 0.1 percent lipolyzed butterfat had a weak flavor and the fermented medium starting with about 2.0 percent lipolyzed butterfat had a strong "cheesy" note. The fermented medium starting with about 0.2 percent by weight lipolyzed butterfat had the most satisfactory buttery cheesy flavor.

Example IV

The first sweet-whey medium of Example I was pasteurized and then fermented for about 24 hours with agitation at the following temperatures: 20° C., 22° C., and 25° C. Each of the resulting fermented media was an acceptable butter flavoring. The medium fermented at about 22° C. had the most appealing butter flavor.

Example V

Seven sweet-whey media were prepared which were identical to the first sweet-whey medium of Example I with the exception that the concentration of the anhydrous citric acid was about 0.1, 0.15, 0.2, 0.25, 0.3, 0.35 and 0.4 percent by weight relative to the weight of each medium. The seven sweet-whey media were pasteurized and fermented as described in Example I. Each of the resulting seven fermented media had an acceptable butter flavor. The fermented medium starting with 0.35 percent by weight citric acid yielded the most satisfactory butter flavor.

Example VI

Seven sweet-whey media were prepared which were identical to the first sweet-whey medium of Example I with the exception that anhydrous pyruvic acid was substituted for the anhydrous citric acid. The concentration of the pyruvic acid in the seven media was about 0.1, 0.15, 0.2, 0.25, 0.3, 0.35, and 0.4 percent by weight relative to the weight of each medium. The seven sweet-whey media were pasteurized and fermented as described in Example I. Each of the resulting seven fermented media had an acceptable butter flavor. The fermented medium starting with 0.3 percent by weight pyruvic acid yielded the most satisfactory butter flavor, which was more intense than the butter flavor of the first fermented medium of Example I.

Example VII

Samples of margarine were prepared on a pilot-plant scale using the composite fermented-whey butter flavoring described in Example I as the only flavoring and the margarine base of a commercially available premium-grade soft tub margarine. The resulting margarine was given to a 60-member panel trained in the evaluation of margarines. The margarine of the invention was compared to the commercial product employing the same margarine base. Both margarines were evaluated on the basis of 41 different butter flavor characteristics. The results of the evaluation are given in the Table VI below.

It is not intended to limit the present invention to the specific embodiments described above. For example, other biosynthesis-precursor compounds may be used as the fortifier and other fatty compounds may be used as the enriching agent in the sweet-whey medium of the invention, if desired. It is recognized that these and other changes may be made in the processes and compositions specifically described herein without departing from the scope and teaching of the instant invention, and it is intended to encompass all other embodiments, alternatives, and modifications consistent with the invention.

TABLE VI

| Flavor Note | Commercial Margarine Score (%) | Fermented-Whey Margarine Score (%) |
| --- | --- | --- |
| acid | 13.3 | 20.0 |
| balance | 13.3 | 20.0 |
| barny | 0 | 0 |
| bitter | 0 | 0 |
| bland | 6.7 | 6.7 |
| blended | 13.3 | 26.7 |
| burned | 0 | 0 |
| buttery | 46.7 | 53.3 |
| caramel | 0 | 0 |
| cardboard | 13.3 | 0 |
| creamy | 53.3 | 60.0 |
| dairy | 33.3 | 40.0 |
| delicate | 6.7 | 0 |
| diacetyl | 20.0 | 6.7 |
| estery | 0 | 6.7 |
| fatty | 20.0 | 13.3 |
| fermented | 0 | 0 |
| flat | 13.3 | 13.3 |
| floral | 0 | 6.7 |
| fresh | 13.3 | 20.0 |
| fruity | 6.7 | 6.7 |
| full | 13.3 | 26.7 |
| grassy | 0 | 6.7 |
| greasy | 6.7 | 6.7 |
| meaty | 0 | 0 |
| metallic | 6.7 | 13.3 |

TABLE VI-continued

| Flavor Note | Commercial Margarine Score (%) | Fermented-Whey Margarine Score (%) |
|---|---|---|
| milky | 20.0 | 13.3 |
| moudly (or musty) | 6.7 | 0 |
| oily | 13.3 | 13.3 |
| oxidized | 6.7 | 6.7 |
| rancid | 13.3 | 0 |
| refreshing | 6.7 | 13.3 |
| salty | 60.0 | 40.0 |
| sharp | 40.0 | 6.7 |
| soapy | 6.7 | 0 |
| stale | 6.7 | 6.7 |
| sweet | 0 | 0 |
| tallowy | 13.3 | 0 |
| thin | 20.0 | 13.3 |
| watery | 6.7 | 0 |
| weak | 13.3 | 20.0 |

We claim:

1. A process for producing a butter flavoring composition comprising a mixture of a first and of a second butter flavoring composition each separately obtained by a process comprising the steps of:
   (a) preparing a sweet-whey medium comprising:
      (a.1) water,
      (a.2) sweet-whey solids,
      (a.3) a fortifier selected from the group consisting of citric acid, pyruvic acid, and salts thereof, and
      (a.4) an enriching agent selected from the group consisting of milkfat and lipolyzed butterfat;
   (b) pasteurizing the sweet-whey medium;
   (c) inoculating the pasteurized sweet-whey medium with a microorganism culture comprising the microorganism Leuconostoc cremoris;
   (d) agitating the inoculated sweet-whey medium in an oxygen-containing atmosphere for an incubation time to aerate the medium during fermentation; and
   (e) maintaining the temperature of the inoculated sweet whey medium during the incubation time within an incubation temperature range effective to promote growth of the microorganism culture to ferment the inoculated sweet-whey medium to produce an aqueous fermented composition suitable as a butter flavoring,
   the ratio of the weight of the sweet-whey solids to the weight of the inoculated sweet-whey medium being in the range of from about 0.08 to about 0.2,
   the ratio of the weight of the fortifier to the weight of the inoculated sweet-whey medium being in the range of from about 0.001 to about 0.004, and
   wherein the process for said first butter flavoring composition employs milkfat as the enriching agent, the ratio of milkfat to inoculated sweet-whey medium being in the range from about 0.005 to about 0.02, and the process for said second butter flavoring composition employing lipolyzed butterfat as the enriching agent, the weight of lipolyzed butterfat to inoculated sweet-whey medium being in the range of from about 0.001 to about 0.02;
   (f) combining said first and second butter flavoring compositions in an amount of about 70 parts to about 30 parts by volume of said first and second butter flavoring compositions respectively.

2. The product produced by the process of claim 1.

* * * * *